US 11,795,004 B2

(12) United States Patent
Yamaguchi

(10) Patent No.: US 11,795,004 B2
(45) Date of Patent: Oct. 24, 2023

(54) CONVEYOR TABLE TRANSFER APPARATUS, TRANSPORT SYSTEM AND CONVEYOR TABLE TRANSFER METHOD

(71) Applicant: YAMAHA HATSUDOKI KABUSHIKI KAISHA, Iwata (JP)

(72) Inventor: Kota Yamaguchi, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 17/760,198

(22) PCT Filed: May 15, 2020

(86) PCT No.: PCT/JP2020/019377
§ 371 (c)(1),
(2) Date: Aug. 5, 2022

(87) PCT Pub. No.: WO2021/229782
PCT Pub. Date: Nov. 18, 2021

(65) Prior Publication Data
US 2023/0055255 A1  Feb. 23, 2023

(51) Int. Cl.
*B65G 35/06* (2006.01)
*B23Q 5/28* (2006.01)
(Continued)

(52) U.S. Cl.
CPC .............. *B65G 35/06* (2013.01); *B23Q 5/28* (2013.01); *B65G 54/02* (2013.01); *H02K 41/033* (2013.01)

(58) Field of Classification Search
CPC .......... B23Q 5/28; B65G 35/06; B65G 54/02; H02K 41/031; H02K 41/033; H02K 41/02
(Continued)

(56) References Cited

U.S. PATENT DOCUMENTS

2002/0163257 A1 * 11/2002 Tsuboi ................. B23Q 1/4866
310/12.06
2007/0137981 A1 * 6/2007 Kettelson ............... B65G 35/06
198/411
(Continued)

FOREIGN PATENT DOCUMENTS

AT          503429    * 10/2007  ............. B65G 47/53
CN     105600704 A     5/2016
(Continued)

OTHER PUBLICATIONS

International Search Report issued in PCT/JP2020/019377; dated Aug. 11, 2020.

*Primary Examiner* — James R Bidwell
(74) *Attorney, Agent, or Firm* — Studebaker & Brackett PC

(57) ABSTRACT

A conveyor table transfer apparatus includes a link mechanism connects the drive member driven by a motor (drive source) and a movable member supporting the movable linear conveyor. The link mechanism has one or more degrees of freedom. The degree of freedom of the link mechanism causes the link mechanism to bend in response to a degree of parallelization between the linear-motion guide rail and the linear-motion guide rail, making it possible to suppress load to be applied to the drive member or the movable member. As a result, it becomes possible to move the movable linear conveyor smoothly without requiring precise adjustment in mounting of the drive member and the movable member on the linear-motion guide rail and the linear-motion guide rail respectively.

18 Claims, 11 Drawing Sheets

(51) Int. Cl.
*H02K 41/03* (2006.01)
*B65G 54/02* (2006.01)

(58) Field of Classification Search
USPC .......................................................... 198/805
See application file for complete search history.

(56) References Cited

U.S. PATENT DOCUMENTS

| | | | | |
|---|---|---|---|---|
| 2013/0259628 | A1* | 10/2013 | Hirasawa | .......... H01L 21/67706 |
| | | | | 414/754 |
| 2016/0347550 | A1* | 12/2016 | Paweletz | ................ B65G 54/02 |
| 2019/0131860 | A1* | 5/2019 | Suzuki | .................... B23Q 7/14 |
| 2021/0061577 | A1* | 3/2021 | Okazaki | ................ B65G 17/06 |

FOREIGN PATENT DOCUMENTS

| | | | | |
|---|---|---|---|---|
| JP | 2010-057280 A | | 3/2010 | |
| JP | 2019-062614 A | | 4/2019 | |
| KR | 10-0955895 | * | 5/2010 | ............. B65G 35/06 |
| WO | 2021/229782 | * | 11/2021 | ............. H02K 41/02 |

* cited by examiner

CONVEYOR TABLE TRANSFER APPARATUS, TRANSPORT SYSTEM AND CONVEYOR TABLE TRANSFER METHOD

CROSS-REFERENCE TO RELATED APPLICATION

This application is a National Stage of International Patent Application No. PCT/JP2020/019377, filed May 15, 2020, the entire contents of which is incorporated herein by reference.

BACKGROUND

Technical Field

The present disclosure relates to a technique of transferring a conveyor table between a plurality of fixed linear conveyors each configured to drive the conveyor table.

Background Art

JP2019-062614 discloses a transport system of circulating a carriage. This transport system includes two transport paths arranged parallel to each other. The transport path has a plurality of guide rails arranged in series and each of the guide rails is provided with a plurality of coils arranged in series. By using magnetic force acting between a permanent magnet provided inside the carriage corresponding to a conveyor table and the coil, the conveyor table is driven along the transport path. This transport path functions as a fixed linear conveyor installed fixedly.

The transport system further includes two transfer devices provided at corresponding both ends of each of the two fixed linear conveyors. Each of the transfer devices has a movable linear conveyor that drives the conveyor table using magnetic force like in the foregoing case and the movable linear conveyor is moved between two facing positions facing the corresponding two fixed linear conveyors. The movable linear conveyor transfers the conveyor table to and from the fixed linear conveyor facing the movable linear conveyor.

SUMMARY

In this case, the movable linear conveyor may be moved by a configuration in which a movable member supporting the movable linear conveyor is moved by following a drive member driven by a drive source. In this configuration, unless a linear-motion guide member that guides the drive member driven by the drive source and a linear-motion guide member that guides the movable member supporting the movable linear conveyor are parallel to each other, unreasonable load is applied to the drive member or to the movable member to disable smooth movement of the movable linear conveyor. On the other hand, mounting these linear-motion guide members with a high degree of parallelization involves precise adjustment.

In moving a movable member supporting a movable linear conveyor by following a drive member driven by a drive source, the present disclosure is intended to provide a technique allowing smooth movement of the movable linear conveyor without involving precise adjustment in mounting of respective linear-motion guide members for the drive member and the movable member.

A conveyor table transfer apparatus according to the disclosure comprises a driver including a drive member a drive source that drives the drive member and a first linear-motion guide member that guides movement of the drive member driven by the drive source; a movable member supporting a movable linear conveyor that drives a conveyor table; a second linear-motion guide member that guides movement of the movable member; and a link mechanism configured to connect the movable member and the drive member to each other and have one or more degrees of freedom. When the drive member is driven along the first linear-motion guide member, the movable member is driven by the drive member through the link mechanism to move along the second linear-motion guide member, thereby moving the movable linear conveyor in a predetermined movement direction.

A conveyor table transfer method according to the disclosure comprises: a step of guiding a drive member using a first linear-motion guide member while driving the drive member using a drive source; and a step of guiding movement of a movable member using a second linear-motion guide member. The movable member supports a movable linear conveyor that drives a conveyor table. The movable member and the drive member are connected to each other by a link mechanism having one or more degrees of freedom, and when the drive member is driven along the first linear-motion guide member. The movable member is driven by the drive member through the link mechanism to move along the second linear-motion guide member, thereby moving the movable linear conveyor in a predetermined movement direction.

According to the present disclosure (conveyor table transfer apparatus and method) having the above-described configuration, the link mechanism connects the drive member driven by the drive source and the movable member supporting the movable linear conveyor. When the drive member is driven along the first linear-motion guide member, the movable member is driven by the drive member through the link mechanism to move along the second linear-motion guide member, thereby moving the movable linear conveyor in the predetermined movement direction. The link mechanism has one or more degrees of freedom. The degree of freedom of the link mechanism causes the link mechanism to bend in response to a degree of parallelization between the first and second linear-motion guide members, making it possible to suppress load to be applied to the drive member or the movable member. As a result, it becomes possible to move the movable linear conveyor smoothly without requiring precise adjustment in mounting of the drive member and the movable member on the respective linear-motion guide members.

The conveyor table transfer apparatus may be configured so that the link mechanism includes a spherical bearing and has the degrees of freedom by the spherical bearing. Using the spherical bearing having three degrees of freedom in the link mechanism in this way causes the link mechanism to bend flexibly, making it possible to suppress load more reliably to be applied to the drive member or the movable member. As a result, even if a degree of parallelization between the first and second linear-motion guide members is low, it is still possible to move the movable linear conveyor smoothly.

The conveyor table transfer apparatus may be configured so that the link mechanism includes two spherical bearings arranged at different positions in the movement direction. Using the two spherical bearings in the link mechanism in this way causes the link mechanism to bend more flexibly, making it possible to suppress load with still higher reliability to be applied to the drive member or the movable member.

The conveyor table transfer apparatus may be configured so that the spherical bearing has an outer race, and an inner race that is arranged inside the outer race and contacts with the outer race at its spherical surface, the conveyor table transfer apparatus further comprising: a bias member that generates pressing force having a component acting in the movement direction with which the outer race and the inner race of the spherical bearing are pressed. This configuration makes it possible to suppress a backlash to be caused in the movement direction between the outer race and the inner race of the spherical bearing. This allows removal of influence to be caused by the backlash of the spherical bearing on the position of the movable linear conveyor.

This configuration is particularly preferred if the movement direction is a horizontal direction. Specifically, in this case, as the own weights of the outer race and the inner race of the spherical bearing do not contribute to suppression of the backlash thereof, it is preferably to use the bias member for suppressing the backlash.

The conveyor table transfer apparatus may be configured so that the driver moves the movable linear conveyor in the movement direction between a first facing position of facing a first fixed linear conveyor mounted on a mounting frame and a second facing position of facing a second fixed linear conveyor mounted on the mounting frame. In this configuration, positioning the movable linear conveyor at the first facing position using the driver allows transfer of the conveyor table between the movable linear conveyor and the first fixed linear conveyor. Also, positioning the movable linear conveyor at the second facing position using the driver allows transfer of the conveyor table between the movable linear conveyor and the second fixed linear conveyor. In particular, in the present embodiment, as the degree of freedom of the link mechanism causes the link mechanism to bend in response to a degree of parallelization between the first and second linear-motion guide members, the movable linear conveyor can be guided in a proper posture to the first or second facing position. This achieves smooth transfer of the conveyor table between the movable linear conveyor and the first or second fixed linear conveyor.

The conveyor table transfer apparatus may be configured so that the second linear-motion guide member is mounted on the first fixed linear conveyor and is mounted on the second fixed linear conveyor. In this configuration, the movement of the movable linear conveyor to the first facing position is guided along the linear-motion guide member mounted on the first fixed linear conveyor. This allows the movable linear conveyor having moved to the first facing position to be positioned correctly relative to the first fixed linear conveyor. Likewise, the movement of the movable linear conveyor to the second facing position is guided along the linear-motion guide member mounted on the second fixed linear conveyor. This allows the movable linear conveyor having moved to the second facing position to be positioned correctly relative to the second fixed linear conveyor. As a result, it becomes possible to transfer the conveyor table smoothly between the fixed linear conveyor and the movable linear conveyor independently of distortion or thermal deformation of the mounting frame on which the fixed linear conveyor is mounted.

The conveyor table transfer apparatus may further comprises: a position detector that detects the position of the movable linear conveyor, wherein the driver controls positioning of the movable linear conveyor at the first facing position and controls positioning of the movable linear conveyor at the second facing position by controlling the position of the movable linear conveyor on the basis of a position detected by the position detector. This configuration allows the position of the movable linear conveyor to be controlled correctly relative to the first or second fixed linear conveyor on the basis of result of the detection by the position detector. However, the position detector is merely to detect the position of the movable linear conveyor at the location of the position detector and is not configured to detect the posture of the movable linear conveyor. Hence, only using the position detector causes a risk of transferring the conveyor table while the movable linear conveyor is in a tilted posture relative to the first or second fixed linear conveyor. In this regard, according to the present disclosure, as the degree of freedom of the link mechanism causes the link mechanism to bend in response to a degree of parallelization between the first and second linear-motion guide members, the movable linear conveyor can be guided in a proper posture to the first or second facing position. This allows the movable linear conveyor to be positioned at a proper position in a proper posture relative to the first or second fixed linear conveyor.

A transport system according to the disclosure comprises: a first fixed linear conveyor that drives a conveyor table; a second fixed linear conveyor that drives the conveyor table; and the conveyor table transfer apparatus according to any one of claims 1 to 8, wherein the conveyor table transfer apparatus transfers the conveyor table between the first fixed linear conveyor and the second fixed linear conveyor.

In moving a movable member supporting a movable linear conveyor by following a drive member driven by a drive source, the present disclosure allows smooth movement of the movable linear conveyor in moving without involving precise adjustment in mounting of respective linear-motion guide members for the drive member and the movable member.

DETAILED DESCRIPTION

Figure 1:
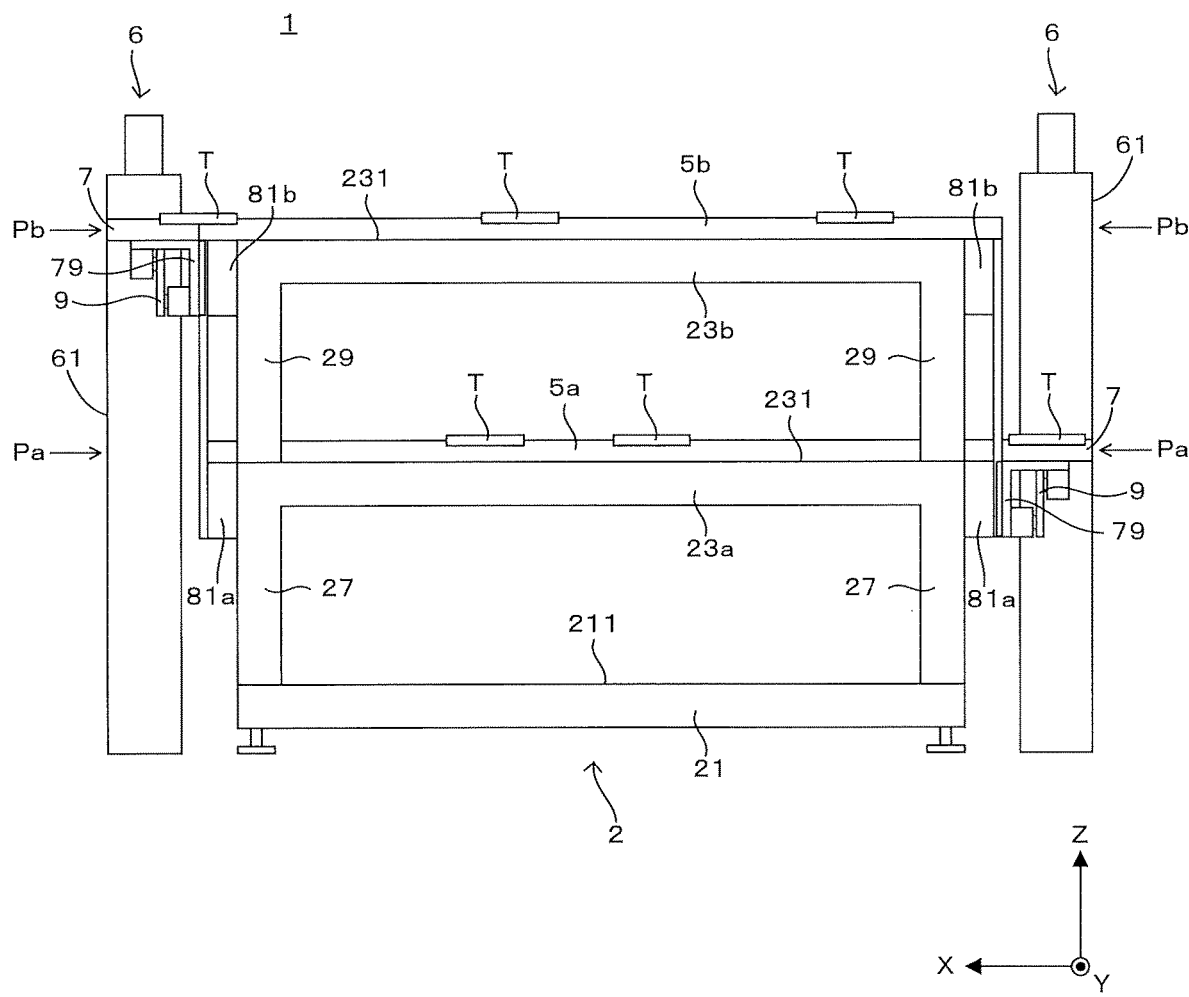
FIG. 1 is a front view schematically showing a transport system according to the present disclosure.

FIG. 1 is a front view schematically showing a transport system according to the present disclosure. In the present description, where appropriate, explanation will be given while referring to an X direction corresponding to a horizontal direction, a Y direction corresponding to a horizontal direction orthogonal to the X direction, and a Z direction corresponding to a vertical direction. As shown in FIG. 1, a transport system 1 has a configuration of circulating and transporting a plurality of conveyor tables T. For example, a work to be processed in a factory where the transport system 1 is installed can be placed on the conveyor table T.

The transport system 1 includes a mounting frame 2 made of metal, for example. The mounting frame 2 includes a base 21, a mounting stage 23a, and a mounting stage 23b. The base 21, the mounting stage 23a, and the mounting stage 23b are rectangular flat plates arranged horizontally and are spaced from each other in the Z direction. The mounting frame 2 has columns 27 standing in the Z direction at four corners of an upper surface 211 of the base 21. The mounting stage 23a is mounted on the respective upper ends of the columns 27 to face the upper surface 211 of the base 21 from above. The mounting frame 2 has columns 29 standing in the Z direction at four corners of an upper surface 231 of the mounting stage 23a. The mounting stage 23b is mounted on the respective upper ends of the columns 29 to face the upper surface 231 of the mounting stage 23a from above. The upper surface 211 of the base 21, the upper surface 231 of the mounting stage 23a, and an upper surface 231 of the mounting stage 23b are each a horizontal plane having a rectangular shape with four sides parallel to the X direction or the Y direction in a plan view from the Z direction.

The transport system 1 includes a fixed linear conveyor 5a mounted on the upper surface 231 of the mounting stage 23a and a fixed linear conveyor 5b mounted on the upper surface 231 of the mounting stage 23b. The fixed linear conveyor 5a is arranged parallel to the X direction. In the X direction, both ends of the fixed linear conveyor 5a project from both ends of the upper surface 231 of the mounting stage 23a. The fixed linear conveyor 5b is arranged parallel to the X direction. In the X direction, both ends of the fixed linear conveyor 5b project from both ends of the upper surface 231 of the mounting stage 23b. The conveyor table T is engageable with and disengageable from the fixed linear conveyors 5a, 5b at the ends of the fixed linear conveyors 5a, 5b in the X direction. Each of the fixed linear conveyors 5a and 5b drives the conveyor table T in the X direction engaged with the fixed linear conveyor itself using magnetic force.

The transport system 1 further includes conveyor table transfer apparatuses 6 arranged on both sides of the mounting frame 2, in other words, on both sides of each of the fixed linear conveyors 5a and 5b in the X direction. Each of the conveyor table transfer apparatuses 6 transfers the conveyor table T from the fixed linear conveyor 5a to the fixed linear conveyor 5b and transfers the conveyor table T from the fixed linear conveyor 5b to the fixed linear conveyor 5a.

The conveyor table transfer apparatus 6 includes a movable linear conveyor 7 arranged parallel to the X direction. The conveyor table T is engageable with and disengageable from the movable linear conveyor 7 at the end of the movable linear conveyor 7 in the X direction. The movable linear conveyor 7 drives the conveyor table T in the X direction engaged with the movable linear conveyor itself using magnetic force. The conveyor table transfer apparatus 6 drives the movable linear conveyor 7 in the Z direction, thereby moving the movable linear conveyor 7 between a facing position Pa of facing the fixed linear conveyor 5a from the X direction and a facing position Pb of facing the fixed linear conveyor 5b from the X direction. The movable linear conveyor 7 at the facing position Pa and the fixed linear conveyor 5a are arranged side by side in the X direction to transfer the conveyor table T to and from each other. The movable linear conveyor 7 at the facing position Pb and the fixed linear conveyor 5b are arranged side by side in the X direction to transfer the conveyor table T to and from each other.

The conveyor table transfer apparatus 6 described above transfers the conveyor table T from the fixed linear conveyor 5a to the fixed linear conveyor 5b as follows. First, the conveyor table transfer apparatus 6 locates the movable linear conveyor 7 at the facing position Pa. Then, the conveyor table T moves from the fixed linear conveyor 5a to the movable linear conveyor 7 at the facing position Pa. Next, the conveyor table transfer apparatus 6 moves the movable linear conveyor 7 from the facing position Pa to the facing position Pb. Finally, the conveyor table T moves from the movable linear conveyor 7 at the facing position Pb to the fixed linear conveyor 5b. In this way, transfer of the conveyor table T is finished. Motions reverse to the foregoing motions can be made to transfer the conveyor table T from the fixed linear conveyor 5b to the fixed linear conveyor 5a.

The configurations on the both sides of the mounting frame 2 (including the two conveyor table transfer apparatuses 6) are common to each other. Thus, the following explanation of the transport system 1 will be given by mainly focusing on the right side of FIG. 1. The linear conveyors 5a and 5b have the same configuration. Thus, if appropriate, the linear conveyors 5a and 5b will be called a fixed linear conveyor 5 if they are not to be particularly distinguished from each other. The mounting stages 23a and 23b on which the fixed linear conveyors 5a and 5b are mounted will also be called a mounting stage 23, if appropriate.

Figure 2:
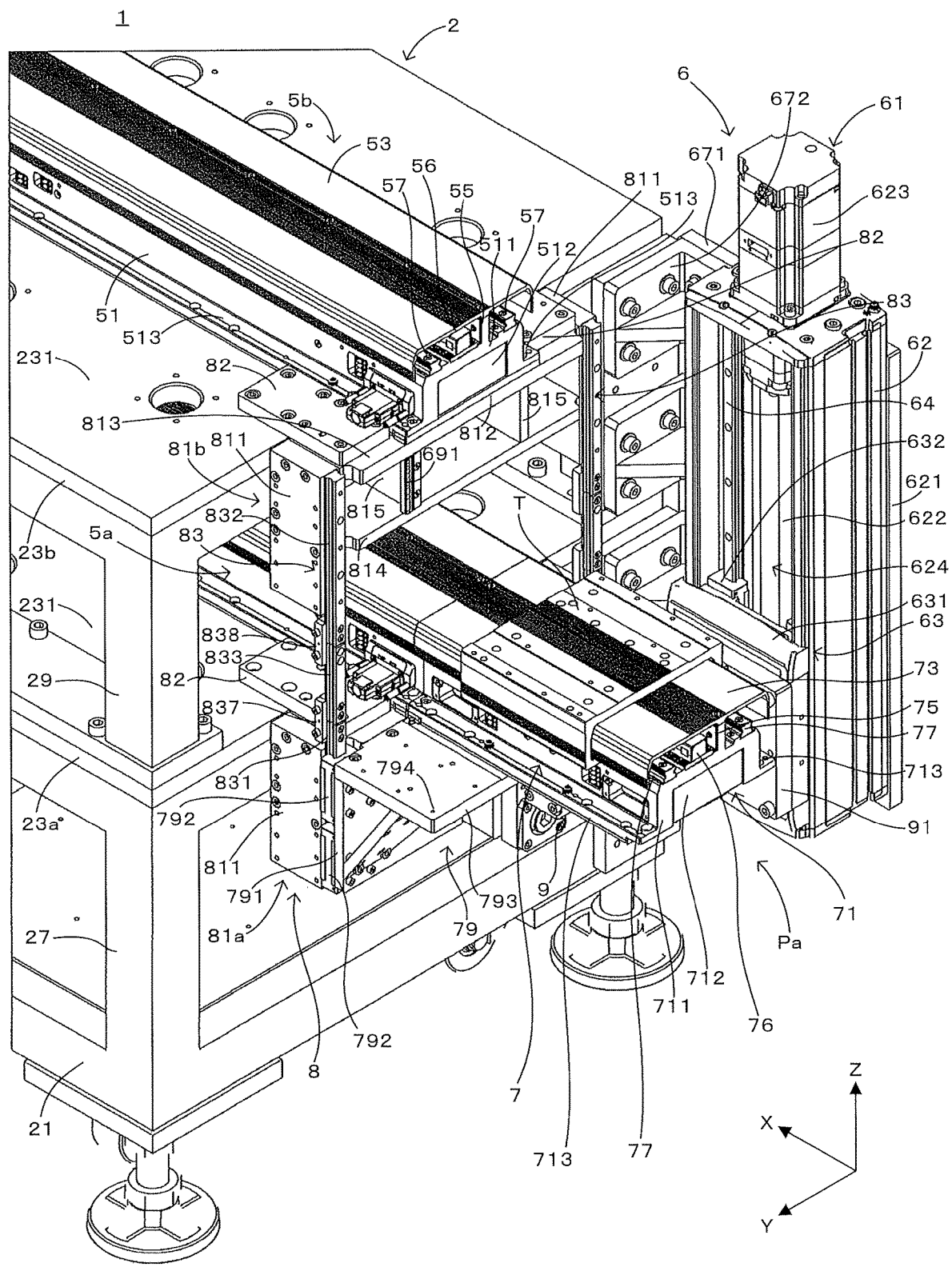
FIG. 2 is a partial perspective view showing the transport system in FIG. 1.
Figure 3:
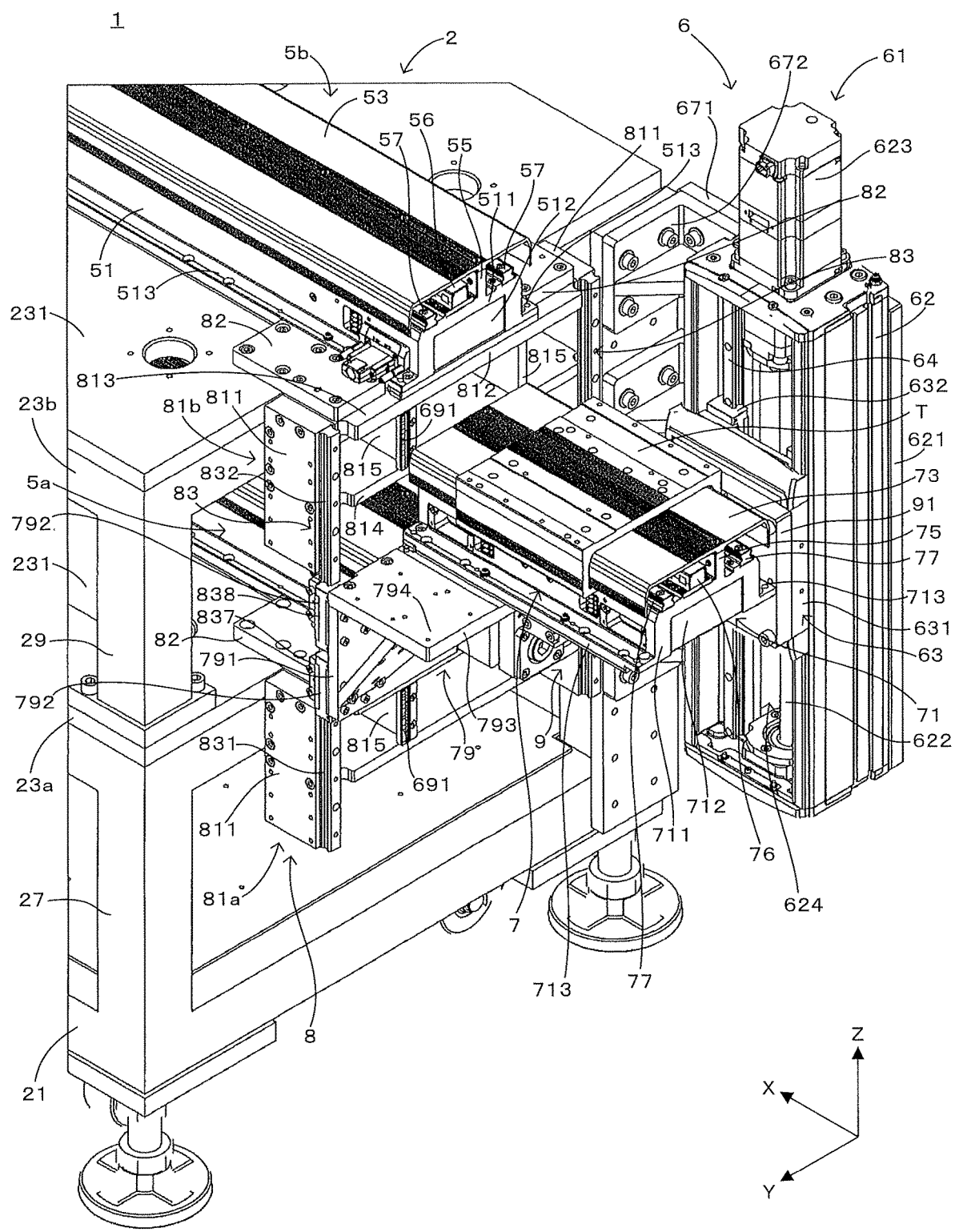
FIG. 3 is a partial perspective view showing the transport system in FIG. 1.
Figure 4:
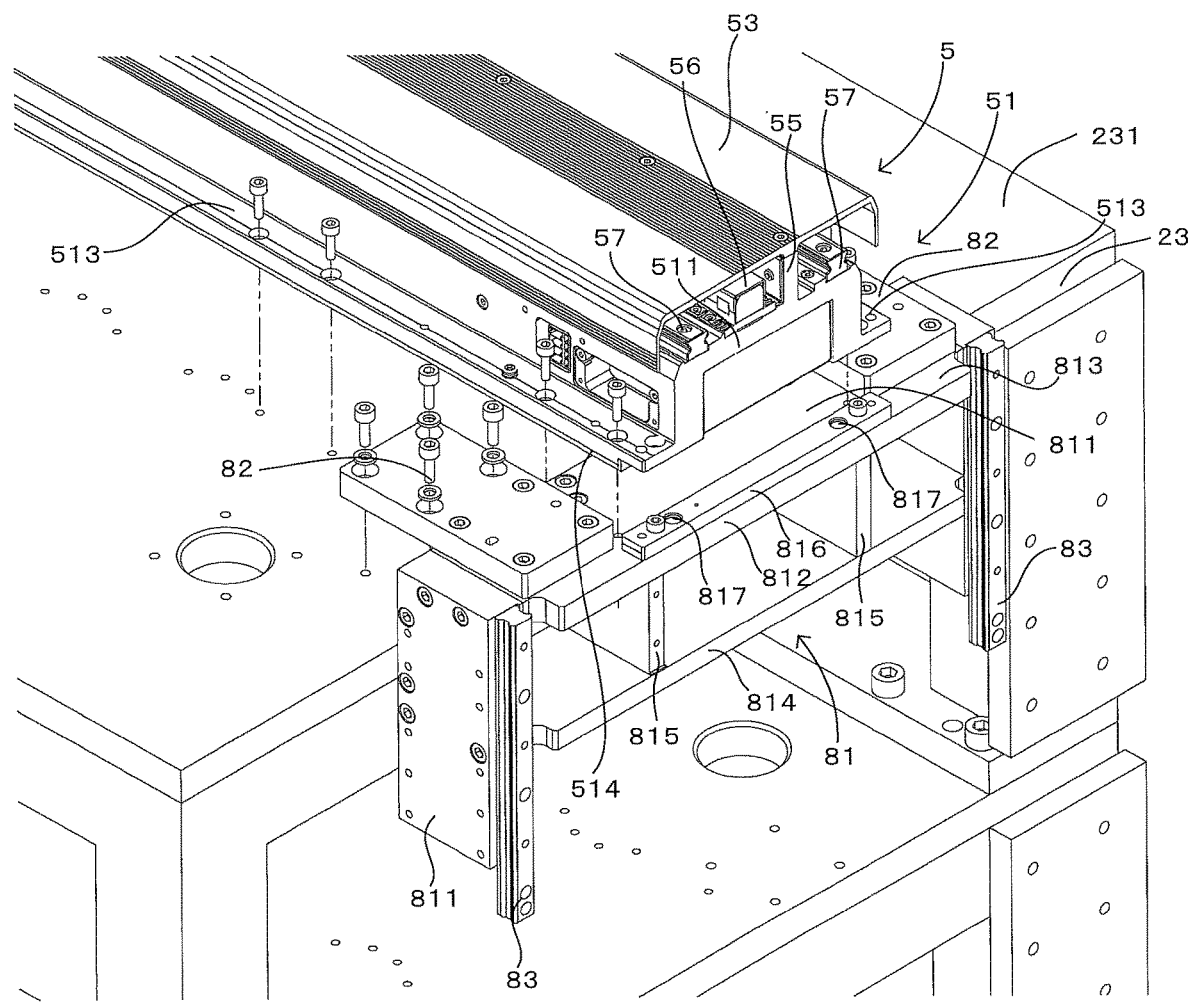
FIG. 4 is partial perspective view showing how the fixed linear conveyor is mounted on the mounting frame.
Figure 5:
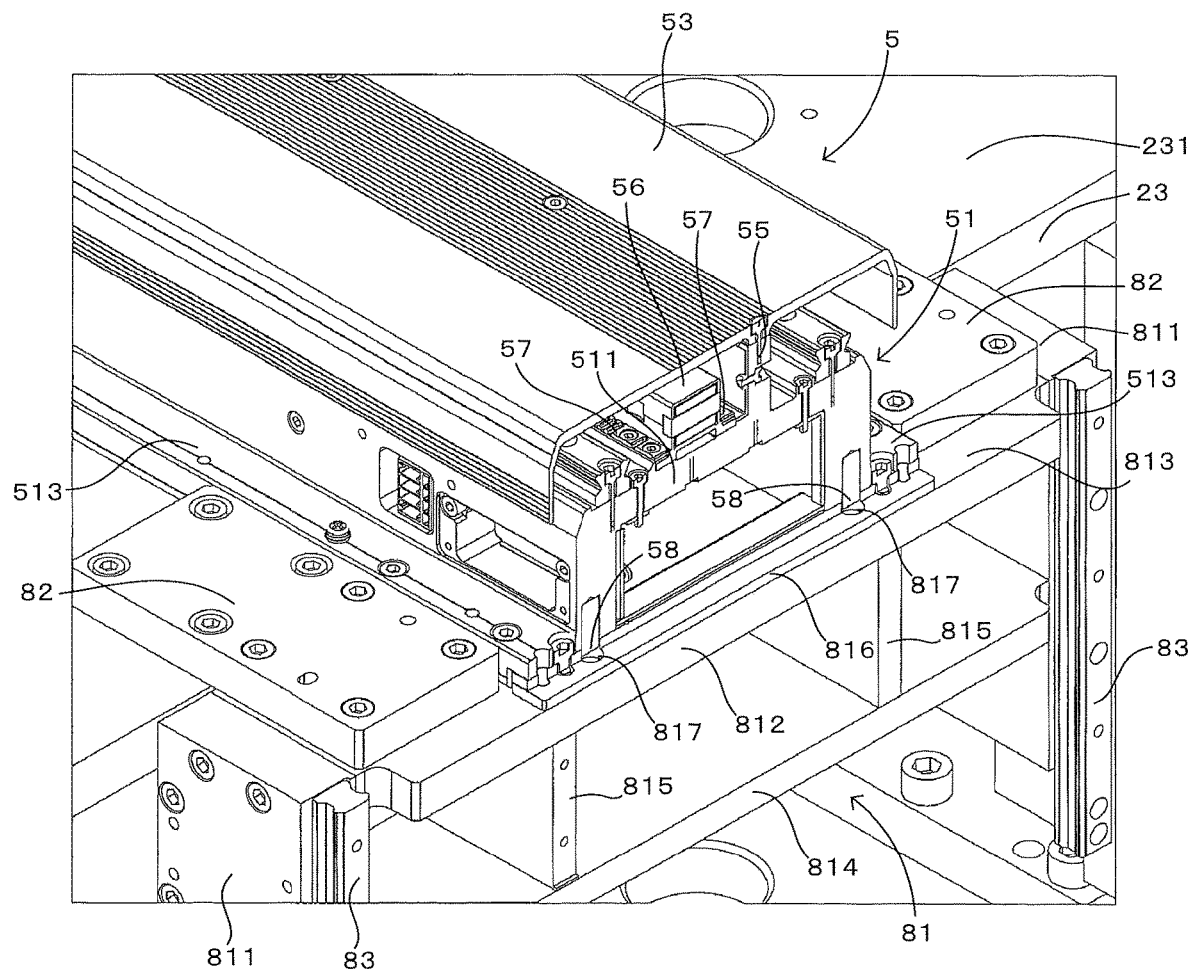
FIG. 5 is partial perspective view showing how the fixed linear conveyor is mounted on the mounting frame.
Figure 5:
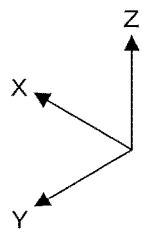
Figure 6:
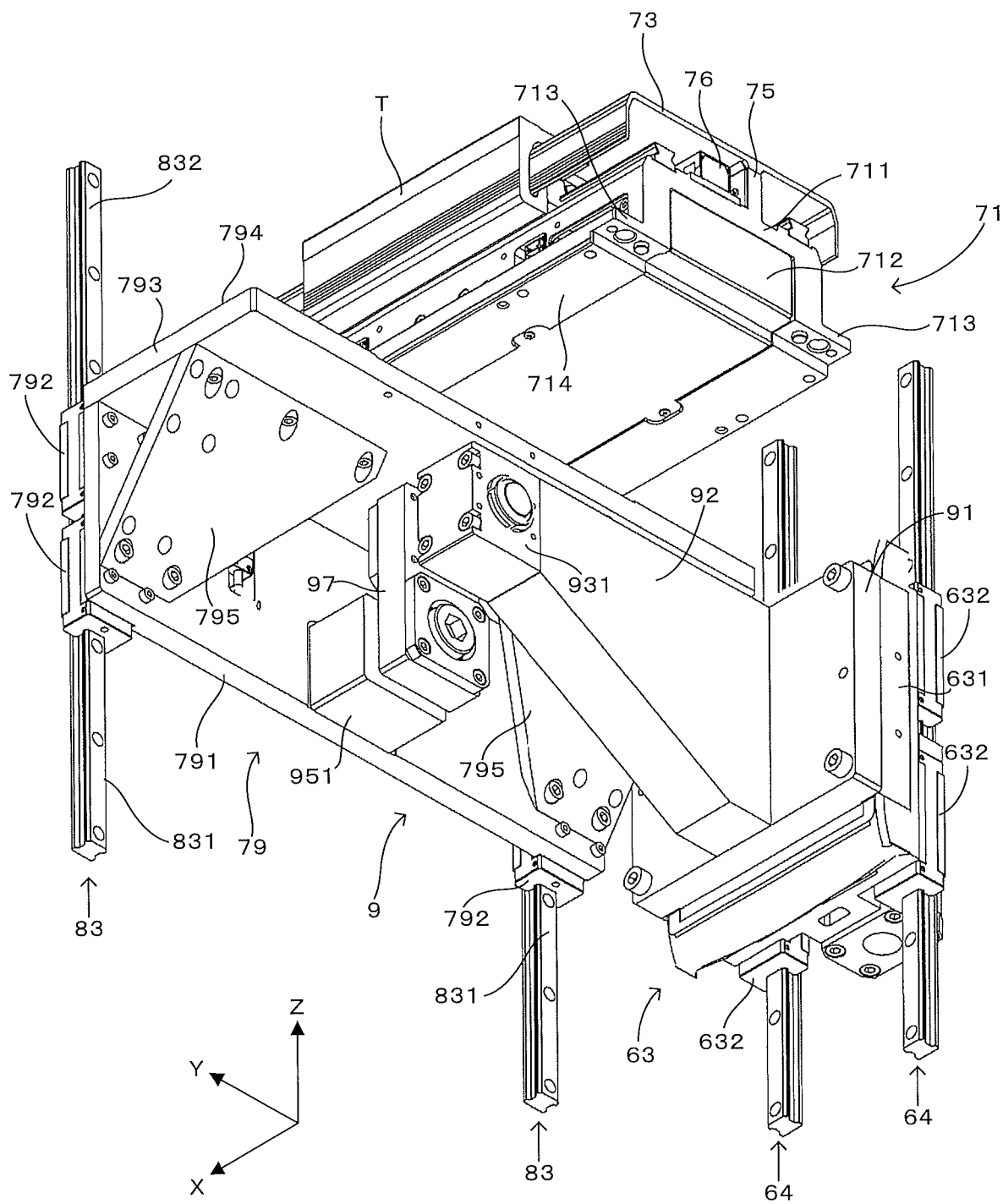
FIG. 6 is a partial perspective view showing the movable linear conveyor and its peripheral structures.

FIGS. 2 and 3 are partial perspective views showing the transport system in FIG. 1. FIGS. 4 and 5 are partial perspective views showing how the fixed linear conveyor is mounted on the mounting frame. FIG. 6 is a partial perspective view showing the movable linear conveyor and its peripheral structures. FIG. 2 shows a state where the movable linear conveyor 7 is at the facing position Pa. FIG. 3 shows a state where the movable linear conveyor 7 is at an intermediary position between the facing position Pa and the facing position Pb. FIG. 4 shows a state where the fixed linear conveyor 5b is separated upward from the mounting stage 23b. FIG. 5 shows a section at an end portion of the fixed linear conveyor 5b intended to illustrate the internal configuration of the fixed linear conveyor 5b. As shown in these drawings. the fixed linear conveyor 5 includes a linear housing 51, a table cover 53 facing the linear housing 51 from above, and a support plate 55 supporting the table cover 53 on the linear housing 51.

The linear housing 51 includes a main housing 511 extending in the X direction. The main housing 511 and the support plate 55 are formed integrally. The table cover 53 is fastened to the upper end of the support plate 55. The main housing 511 surrounds housing space opening downward from above and from sides, and has an inverted U-shape in a side view from the X direction. The linear housing 51 includes an electrical box 512 arranged in the housing space of the main housing 511. The electrical box 512 extends in the X direction and houses an electrical system of the fixed linear conveyor 5. The linear housing 51 further includes mounting flanges 513 projecting sideway (Y direction) from the lower end of the main housing 511. The mounting flanges 513 extend from both sides of the main housing 511 in the Y direction. The respective bottom surfaces of the main housing 511 and the mounting flanges 513 are flush with each other to form a bottom surface 514 of the fixed linear conveyor 5 (FIG. 4). The bottom surface 514 is a horizontal plane and contacts the upper surface 231 of the mounting stage 23. The main housing 511 and the mounting flanges 513 may be formed separately or may be formed integrally. The mounting flanges 513 are fastened at a plurality of fastening positions aligned in the X direction to the upper surface 231 of the mounting stage 23 with fastening members (screws). In this way, the fixed linear conveyor 5a is fixed to the upper surface 231 of the mounting stage 23a and the fixed linear conveyor 5b is fixed to the upper surface 231 of the mounting stage 23b.

The table cover 53 extends in the X direction. The conveyor table T is fittable over and separable from both ends of the table cover 53 in the X direction. The conveyor table T engaged with the table cover 53 moves in the X direction along the table cover 53. The support plate 55 stands in the Z direction while extending in the X direction. The support plate 55 supports the table cover 53 while keeping an interval from the upper surface of the main housing 511 of the linear housing 51.

The fixed linear conveyor 5 further includes a linear motor stator 56 arranged between the upper surface of the main housing 511 and the table cover 53. The linear motor stator 56 has a plurality of coils arranged in the X direction and drives the conveyor table T in the X direction using magnetic force generated between a linear motor mover (permanent magnet) provided in the conveyor table T and the coils. A current to flow through the coils of the linear motor stator 56 is controlled by the electrical system housed in the electrical box 512.

The fixed linear conveyor 5 includes linear-motion guide rails 57 in a pair arranged between the upper surface of the main housing 511 and the table cover 53. The linear-motion guide rails 57 in a pair extend in the X direction and are spaced from each other in the Y direction. The linear-motion guide rails 57 in a pair are arranged at both ends of the upper surface of the main housing 511 in the Y direction in such a manner as to interpose the support plate 55 and the linear motor stator 56 therebetween in the Y direction. The conveyor table T is engageable with and disengageable from both ends of the linear-motion guide rail 57 in the X direction. Movement of the conveyor table T engaged with linear-motion guide 57 is guided by the linear-motion guide 57 in the X direction.

As described above, the conveyor table transfer apparatus 6 includes the movable linear conveyor 7. The movable linear conveyor 7 differs from the fixed linear conveyor 5 in the length in the X direction (the movable linear conveyor 7 is shorter than the fixed linear conveyor 5). As for the other points, the configuration of the movable linear conveyor 7 is the same as that of the fixed linear conveyor 5.

Specifically, the movable linear conveyor 7 includes a linear housing 71 extending in the X direction. The linear housing 71 includes a main housing 711, an electrical box 712, and mounting flanges 713. The movable linear conveyor 7 further includes a table cover 73 and a support plate 75. The table cover 73 is supported by the support plate 75 while being spaced from the upper surface of the main housing 711 of the linear housing 71. The conveyor table T is fittable over and separable from both ends of the table cover 73 in the X direction. The conveyor table T engaged with the table cover 73 moves in the X direction along the table cover 73.

The movable linear conveyor 7 further includes a linear motor stator 76 arranged between the upper surface of the main housing 711 and the table cover 73. On the basis of control by an electrical system housed in the electrical box 712, the linear motor stator 76 drives the conveyor table T in the X direction using magnetic force generated between a linear motor mover of the conveyor table T and the linear motor stator 76. The movable linear conveyor 7 includes linear-motion guide rails 77 in a pair arranged between the upper surface of the main housing 711 and the table cover 73. The linear-motion guide rails 77 in a pair extend in the X direction and are spaced from each other in the Y direction. The conveyor table T is engageable with and disengageable from both ends of the linear-motion guide rail 77 in the X direction. Movement of the conveyor table T engaged with linear-motion guide rail 77 is guided by the linear-motion guide rail 77 in the X direction.

The conveyor table transfer apparatus 6 includes a linear-motion guide mechanism 8 that guides movement of the movable linear conveyor 7 in the Z direction between the facing position Pa and the facing position Pb. The linear-motion guide mechanism 8 includes a mounting block 81a mounted on the fixed linear conveyor 5a and a mounting block 81b mounted on the fixed linear conveyor 5b. While the mounting block 81a and the mounting block 81b are mounted on different subjects, they have the same configuration. Thus, if the mounting block 81a and the mounting block 81b are not to be particularly distinguished from each other, these will be called a mounting block 81, if appropriate.

The mounting block 81 includes side wall plates 811 in a pair spaced from each other in the Y direction. Each of the side wall plates 811 is a flat plate arranged parallel to the Z direction and the X direction and has a rectangular shape extending in the Z direction. The mounting block 81a includes a mounting plate 812 extending in the Y direction between the respective upper ends of the side wall plates 811 in a pair. The mounting plate 812 is a flat plate arranged horizontally. The mounting plate 812 has an upper surface 813 that is a horizontal plane. The mounting block 81a further includes a reinforcing plate 814 provided under the mounting plate 812 and arranged horizontally between the side wall plates 811 in a pair. The reinforcing plate 814 has the same configuration as the mounting plate 812. Each of the mounting plate 812 and the reinforcing plate 814 has both ends in the Y direction fixed to the side wall plates 811 in a pair. The mounting block 81 includes reinforcing plates 815 in a pair provided between the mounting plate 812 and the reinforcing plate 814 and extending in the Z direction. Each of the reinforcing plates 815 is a flat plate arranged parallel to the Z direction and the X direction and has a rectangular shape extending in the Z direction. Each of the reinforcing plates 815 has both ends in the Z direction fixed to the mounting plate 812 and the reinforcing plate 814.

The mounting block 81 further includes a positioning member 816 for determining a position relative to the fixed linear conveyor 5. As shown in FIG. 5, the positioning member 816 is fixed to the upper surface 813 of the mounting plate 812 and includes engagement holes 817 in a pair arranged at an interval from each other in the Y direction. Each of the engagement holes 817 has an upward-pointing opening. The fixed linear conveyor 5 includes engagement projections 58 in a pair arranged at the same interval in the Y direction and provided at an end portion of the fixed linear conveyor 5 in the X direction. Each of the engagement projections 58 projects downward from the bottom surface 514. By making engagement of the engagement projections 58 in a pair of the fixed linear conveyor 5 with the engagement holes 817 in a pair of the positioning member 816 from above, the positions of the fixed linear conveyor 5 and the mounting block 81 are determined in the horizontal direction (X direction, Y direction).

The above-described mounting block 81 is mounted on the fixed linear conveyor 5 as follows. Specifically, the upper surface 813 of the mounting plate 812 of the mounting block 81 is arranged flush with the upper surface 231 of the mounting stage 23. A part (mounting surface) of the bottom surface 514 of the fixed linear conveyor 5 projecting in the X direction comes into contact with the upper surface 813 of the mounting plate 812. The above-described engagement projections 58 in a pair are provided at the part (mounting surface) projecting in the X direction from the mounting stage 23 and are engaged with the engagement holes 817 in a pair. The mounting flange 513 of the fixed linear conveyor 5 projects in the X direction from the mounting stage 23 to the mounting plate 812 to come into contact with the upper surface 813 of the mounting plate 812, and is fastened at a plurality of fastening positions aligned in the X direction to the upper surface 231 of the mounting stage 23 with fastening members (screws). In this way, the upper surface 813 of the mounting block 81a is mounted on the bottom surface 514 of the fixed linear conveyor 5a, and the upper surface 813 of the mounting block 81b is mounted on the bottom surface 514 of the fixed linear conveyor 5b.

The linear-motion guide mechanism 8 includes support plates 82 in a pair for mounting the mounting block 81 on the mounting stage 23. Each of the support plates 82 is a flat plate arranged horizontally and has a rectangular shape extending in the X direction. The support plates 82 in a pair are arranged on the both sides of the fixed linear conveyor 5 in the Y direction. Meanwhile, the mounting plate 812 projects to the both sides of the fixed linear conveyor 5 in the Y direction. Each of the support plates 82 is provided as a bridge between the upper surface 231 of the mounting stage 23 and the upper surface 813 of the mounting plate 812 (a part thereof projecting in the Y direction from the fixed linear conveyor 5). Each of the support plates 82 is fastened at a plurality of fastening positions to each of the mounting stage 23 and the mounting plate 812 with fastening members (screws). Specifically, the mounting block 81 is supported on the mounting stage 23 across the support plates 82 in a pair.

The mounting block 81a mounted on the fixed linear conveyor 5a and the mounting block 81b mounted on the fixed linear conveyor 5b in this way are spaced from each other in the Z direction. The side wall plates 811 in a pair of the mounting block 81a and the side wall plates 811 in a pair of the mounting block 81b face each other while being spaced from each other in the Z direction. Specifically, on the assumption that a left side and a right side taken in the Y direction shown in FIGS. 2 to 6 are one side and the other side respectively, the side wall plate 811 of the mounting block 81a on the one side and the side wall plate 811 of the mounting block 81b on the one side face each other while being spaced from each other in the Z direction. Also, the side wall plate 811 of the mounting block 81a on the other side and the side wall plate 811 of the mounting block 81b on the other side face each other while being spaced from each other in the Z direction.

The linear-motion guide mechanism 8 further includes linear-motion guide rails 83 in a pair each extending in the Z direction. The linear-motion guide rails 83 are arranged parallel to each other while being spaced from each other in the Y direction. The linear-motion guide rails 83 in a pair are provided in response to the side wall plates 811 in a pair of each of the mounting blocks 81a and 81b. Specifically, the linear-motion guide rail 83 on the one side is provided as a bridge between the side wall plate 811 of the mounting block 81a on the one side and the side wall plate 811 of the mounting block 81b on the on side. The linear-motion guide rail 83 on the other side is provided as a bridge between the side wall plate 811 of the mounting block 81a on the other side and the side wall plate 811 of the mounting block 81b on the other side.

In the Z direction, the position (height) of the lower end of the linear-motion guide rail 83 matches the position (height) of the lower end of the side wall plate 811 of the mounting block 81a, and the position (height) of the upper end of the linear-motion guide rail 83 matches the position (height) of the upper end of the side wall plate 811 of the mounting block 81b. The linear-motion guide rail 83 in a certain range from its lower end contacts the side wall plate 811 of the mounting block 81a from the X direction and is fastened to this side wall plate 811 with a fastening member (screw). The linear-motion guide rail 83 in a certain range from its upper end contacts the side wall plate 811 of the mounting block 81b from the X direction and is fastened to this side wall plate 811 with a fastening member (screw).

Each of the linear-motion guide rails 83 includes a split guide rail 831, a split guide rail 832, and an intermediary guide rail 833. The split guide rail 831 is mounted on the side wall plate 811 of the mounting block 81a from the X direction and is supported by this side wall plate 811 parallel to the Z direction. In the Z direction, the lower end of the split guide rail 831 is at the same position (height) as the lower end of the side wall plate 811 of the mounting block 81a while the upper end of the split guide rail 831 projects more upward than this side wall plate 811. The split guide rail 832 is mounted on the side wall plate 811 of the mounting block 81b from the X direction and is supported by this side wall plate 811 parallel to the Z direction. In the Z direction, the upper end of the split guide rail 832 is at the same position (height) as the upper end of the side wall plate 811 of the mounting block 81b while the lower end of the split guide rail 832 projects more downward than this side wall plate 811.

The split guide rail 831 and the split guide rail 832 face each other while being spaced from each other in the Z direction. The intermediary guide rail 833 is arranged parallel to the Z direction between the split guide rail 831 and the split guide rail 832. In this way, the split guide rail 831, the intermediary guide rail 833, and the split guide rail 832 are arranged sequentially in a line in the Z direction. An allowance (clearance) is provided between the split guide rail 831 and the intermediary guide rail 833. An allowance (clearance) is provided between the intermediary guide rail 833 and the split guide rail 832.

The split guide rails 831, 832 and the intermediary guide rail 833 are made of different materials. More specifically, the split guide rails 831 and 832 are made of quenched iron and the intermediary guide rail 833 is made of unquenched iron. Thus, the intermediary guide rail 833 has lower strength than the split guide rails 831 and 832 and is deformed flexibly in response to load.

The linear-motion guide rail 83 further includes a coupling member 837 mounting the split guide rail 831 and the intermediary guide rail 833 on each other, and a coupling member 838 mounting the split guide rail 832 and the intermediary guide rail 833 on each other. Specifically, the coupling member 837 has a configuration of fastening a stay extending over the split guide rail 831 and the intermediary guide rail 833 to these rails with a fastening member, thereby fixing and connecting the split guide rail 831 and the intermediary guide rail 833 to each other. The coupling member 838 has a configuration of fastening a stay extending over the split guide rail 832 and the intermediary guide rail 833 to these rails with a fastening member, thereby fixing and connecting the split guide rail 832 and the intermediary guide rail 833 to each other. In the X direction, the coupling members 837 and 838 are arranged on the same side as the side wall plate 811 relative to the linear-motion guide rail 83 and are located between the respective side wall plates 811 of the mounting blocks 81a and 81b.

The conveyor table transfer apparatus 6 further includes a movable member 79 moving the movable linear conveyor 7 along the linear-motion guide rail 83 of the linear-motion guide mechanism 8. The movable member 79 includes a movable plate 791 arranged parallel to the Y direction and the Z direction. In the X direction, the movable plate 791 is arranged on the opposite side of the side wall plate 811 relative to the linear-motion guide rail 83. Both ends of the movable plate 791 in the Y direction face the linear-motion guide rails 83 in a pair from the X direction.

The movable member 79 includes sliders 792 mounted on each of one end portion and the other end portion of the movable plate 791 in the Y direction. The sliders 792 extend in the Z direction. The sliders 792 at the one end portion of the movable plate 791 are located between the movable plate 791 and the linear-motion guide rail 83 on the one side and are engaged with the linear-motion guide rail 83 on the one side. The sliders 792 at the other end portion of the movable plate 791 are located between the movable plate 791 and the linear-motion guide rail 83 on the other side and are engaged with the linear-motion guide rail 83 on the other side. The sliders 792 are slidable in the Z direction along the corresponding linear-motion guide rails 83 with which these sliders 792 are engaged.

The movable member 79 further includes a support plate 793 mounted on the upper end of the movable plate 791. In the X direction, the support plate 793 projects from the upper end of the movable plate 791 toward the opposite side of the side wall plate 811 and is supported horizontally. The support plate 793 has an upper surface 794 that is a horizontal plane. The movable member 79 further includes reinforcing braces 795 in a pair mounted on the movable plate 791 and the support plate 793. Each of the reinforcing braces 795 reinforces support of the support plate 793 using the movable plate 791.

The movable linear conveyor 7 is mounted on the upper surface 794 of the support plate 793. Specifically, the respective bottom surfaces of the main housing 711 and the mounting flanges 713 of the movable linear conveyor 7 are flush with each other to form a bottom surface 714 of the movable linear conveyor 7 (FIG. 6). The bottom surface 714 of the movable linear conveyor 7 contacts the upper surface 794 of the support plate 793. Each of the mounting flanges 713 of the movable linear conveyor 7 is fastened at a plurality of fastening positions aligned in the X direction to the upper surface 794 of the support plate 793 with fastening members (screws). In the X direction, the bottom surface 714 of the movable linear conveyor 7 contacts the upper surface 794 of the support plate 793 in a part (half) thereof closer to the mounting frame 2 and projects from the upper surface 794 of the support plate 793 in a part (half) thereof on the opposite side of the mounting frame 2.

In this configuration, movement of the movable linear conveyor 7 in the Z direction can be guided by the linear-motion guide rail 83 engaged with the movable member 79 supporting the movable linear conveyor 7. The conveyor table transfer apparatus 6 includes a driver 61 configured to drive the movable linear conveyor 7 in the Z direction. The driver 61 includes a single-axis robot 62 installed parallel to the Z direction, a drive member 63 that moves in the Z direction in response to the driving force of the single-axis robot 62, and linear-motion guide rails 64 in a pair that guide the movement of the drive member 63.

The single-axis robot 62 is arranged at a position shifted in the Y direction from the movable linear conveyor 7 and the movable member 79, and includes a robot housing 621 extending in the Z direction, a ball screw 622 arranged parallel to the Z direction, and a motor 623 for rotating the ball screw 622. The robot housing 621 of the single-axis robot 62 has an opening 624 facing the movable linear conveyor 7 from the Y direction. The ball screw 622 is arranged in the robot housing 621. The motor 623 is mounted on the upper end of the robot housing 621. The ball screw 622 and the motor 623 are coupled to each other. The single-axis robot 62 is mounted on the mounting frame 2 with a fitting composed of a back plate 671 and an L-shape metal part 672. More specifically, the back plate 671 is a flat plate parallel to the Z direction and the X direction and extending long in the Z direction. The back plate 671 is mounted on a surface of the single-axis robot 62 on the opposite side of the movable linear conveyor 7 in the Y direction. With a plurality of the L-shape metal parts 67 aligned in the Z direction, the back plate 671 is mounted on the mounting frame 2. In this way, the single-axis robot 62 is fixed to and supported on the mounting frame 2.

The linear-motion guide rails 64 in a pair are arranged parallel to the Z direction while being spaced from each other in the X direction. The linear-motion guide rails 64 are arranged in the robot housing 621 in such a manner as to interpose the ball screw 622 therebetween as viewed from the Y direction and are mounted on the inner wall of the robot housing 621.

The drive member 63 is arranged at a position shifted in the Y direction closer to the single-axis robot 62 than the movable member 79 and is located between the movable member 79 and the single-axis robot 62. The drive member 63 includes a drive plate 631 arranged parallel to the Z direction and the X direction, and sliders 632 mounted on each of both end portions of the drive plate 631 in the X direction. The sliders 632 extend in the Z direction. The slider 632 at the one end portion of the drive plate 631 and the slider 632 at the other end portion of the drive plate 631 in the X direction are engaged with the linear-motion guide rails 64 in a pair. Specifically, in the X direction, the slider 632 at the one end portion of the drive plate 631 is engaged with one of the linear-motion guide rails 64 and the slider 632 at the other end portion of the drive plate 631 is engaged with the other linear-motion guide rail 64. Moreover, the drive plate 631 is mounted on a nut of the ball screw 622 and moves in the Z direction along with the nut.

In this configuration, the drive member 63 can be moved in the Z direction by rotating the ball screw 622 using the motor 623. Furthermore, the movement of the drive member 63 in the Z direction can be guided by the linear-motion guide rail 64 engaged with the drive member 63.

Figure 7:
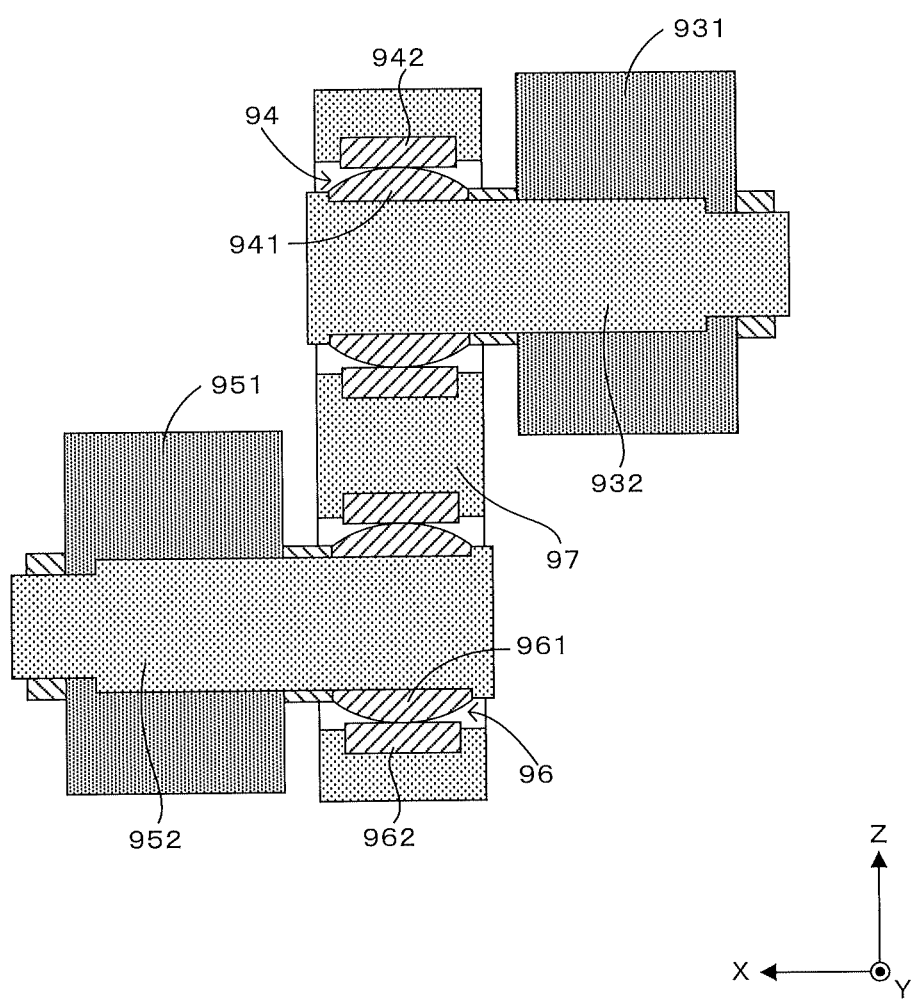
FIG. 7 schematically shows a section taken at a part of the link mechanism.

The conveyor table transfer apparatus 6 further includes a link mechanism 9 configured to connect the movable member 79 supporting the movable linear conveyor 7 and the drive member 63 driven by the single-axis robot 62. The link mechanism 9 will be described by further referring to FIG. 7. FIG. 7 schematically shows a section taken at a part of the link mechanism.

The link mechanism 9 includes a connection plate 91 arranged parallel to the Z direction and the X direction, and an arm 92 extending in the Y direction from the connection plate 91. The connection plate 91 is mounted on the drive plate 631 of the drive member 63. The arm 92 extends parallel to the Y direction from the connection plate 91 toward the movable member 79 side. The arm 92 is a flat plate with a tapered shape shrinking toward the movable member 79 side in the Y direction. The arm 92 is arranged on the opposite side of the linear-motion guide rail 83 relative to the movable plate 791 in the X direction.

The link mechanism 9 further includes a shaft holder 931 mounted on a tip of the arm 92 in the Y direction (one end on the movable member 79 side, out of both ends of the arm 92), and a shaft 932 held by the shaft holder 931. The shaft 932 is held parallel to the X direction. The shaft 932 has a tip portion projecting in the X direction from the shaft holder 931 toward the movable plate 791 side. A spherical bearing 94 is mounted on this tip portion of the shaft 932. The spherical bearing 94 has an inner race 941 fixed to the shaft 932, and an outer race 942 fitted over the inner race 941. The inner race 941 and the outer race 942 are allowed to move slidably relative to each other while forming spherical contact therebetween.

The link mechanism 9 further includes a shaft holder 951 mounted on the movable plate 791, and a shaft 952 held by the shaft holder 951. The shaft 952 is held parallel to the X direction. The shaft 952 has a tip portion projecting in the X direction from the shaft holder 951 toward the shaft holder 931 side. A spherical bearing 96 is mounted on this tip portion of the shaft 952. The spherical bearing 96 includes an inner race 961 fixed to the shaft 952, and an outer race 962 fitted over the inner race 961. The inner race 961 and the outer race 962 are allowed to move slidably relative to each other while forming spherical contact therebetween.

As described above, the link mechanism 9 includes the spherical bearing 94 and the spherical bearing 96 arranged in the Z direction. The link mechanism 9 further includes a holder plate 97 holding the outer races 942 and 962 of the spherical bearings 94 and 96 respectively. Specifically, the outer race 942 of the spherical bearing 94 and the outer race 962 of the spherical bearing 96 are fixed to the holder plate 97.

In this way, the link mechanism 9 connects the drive member 63 and the movable member 79 to each other using the two spherical bearings 94 and 96 each having three degrees of freedom. In this configuration, in response to rotation of the ball screw 622 caused by the driver 61, the drive member 63 moves in the Z direction while being guided by the linear-motion guide rails 64 in a pair. This movement of the drive member 63 is transmitted through the link mechanism 9 to the movable member 79 to drive the movable member 79 in the Z direction. As a result, the movable linear conveyor 7 is driven in the Z direction while being guided by the linear-motion guide rails 83 in a pair.

The above-described conveyor table transfer apparatus 6 allows the movable linear conveyor 7 to be positioned at each of the facing position Pa and the facing position Pb using the driver 61. To make this positioning correctly, the conveyor table transfer apparatus 6 includes a position detector 69 (FIG. 8) that detects the position of the movable linear conveyor 7.

Figure 8:
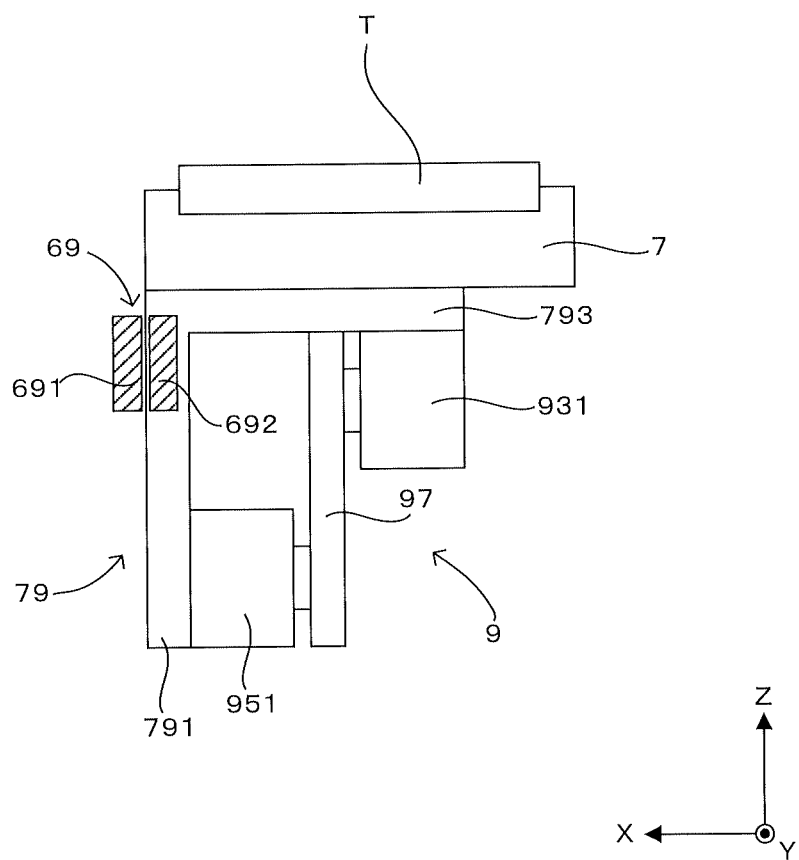
FIG. 8 schematically shows the configuration of the position detector that detects the position of the movable linear conveyor.

FIG. 8 schematically shows the configuration of the position detector that detects the position of the movable linear conveyor. The position detector 69 includes a linear scale 691 and a linear sensor 692. The linear scale 691 is mounted on each of the mounting block 81a and the mounting block 81b. In particular, as shown in FIGS. 2 and 3, the linear scale 691 is mounted on the reinforcing plate 815 of the mounting block 81 and is arranged parallel to the Z direction. The linear sensor 692 is mounted on the movable plate 791 of the movable member 79 supporting the movable linear conveyor 7 and is arranged parallel to the Z direction. In this configuration, the linear sensor 692 reads the linear scale 691 while facing the linear scale 691 from the X direction, thereby detecting the position (height) of the movable linear conveyor 7 in the Z direction.

For positioning the movable linear conveyor 7 at the facing position Pa, the motor 623 of the conveyor table transfer apparatus 6 controls the amount of rotation of the ball screw 622 on the basis of result read by the linear sensor 692 reading the linear scale 691 mounted on the mounting block 81a. This allows the movable linear conveyor 7 to be positioned correctly at the facing position Pa. For locating the movable linear conveyor 7 at the facing position Pb, the motor 623 of the conveyor table transfer apparatus 6 controls the amount of rotation of the ball screw 622 on the basis of result read by the linear sensor 692 reading the linear scale 691 mounted on the mounting block 81b. This allows the movable linear conveyor 7 to be positioned correctly at the facing position Pb.

As shown in FIG. 2, while the movable linear conveyor 7 is at the facing position Pa, the movable member 79 faces the mounting block 81a from the X direction across the linear-motion guide rail 83. Specifically, the mounting block 81a adjoins the movable member 79 engaged with the linear-motion guide rail 83 from the X direction, and supports a lower end portion of the linear-motion guide rail 83, where the movable member 79 is engaged, from a side opposite a surface of the linear-motion guide rail 83 where the movable member 79 is mounted on the linear-motion guide rail 83 (a surface on the movable member 79 side in the X direction). This allows the movable linear conveyor 7 at the facing position Pa to be supported firmly with the mounting block 81a.

Likewise, while the movable linear conveyor 7 is at the facing position Pb, the movable member 79 faces the mounting block 81b from the X direction across the linear-motion guide rail 83. Specifically, the mounting block 81b adjoins the movable member 79 engaged with the linear-motion guide rail 83 from the X direction, and supports an upper end portion of the linear-motion guide rail 83, where the movable member 79 is engaged, from a side opposite a surface of the linear-motion guide rail 83 where the movable member 79 is mounted on the linear-motion guide rail 83 (a surface on the movable member 79 side in the X direction). This allows the movable linear conveyor 7 at the facing position Pb to be supported firmly with the mounting block 81b.

In the above-described embodiment, the link mechanism 9 connects the drive member 63 driven by the motor 623 (drive source) and the movable member 79 supporting the movable linear conveyor 7. When the drive member 63 is driven along the linear-motion guide rail 64 (first linear-motion guide member), the movable member 79 is driven by the drive member 63 through the link mechanism 9 to move along the linear-motion guide rail 83 (second linear-motion guide member), thereby moving the movable linear conveyor 7 in the Z direction (predetermined movement direction). The link mechanism 9 has one or more degrees of freedom. The degree of freedom of the link mechanism 9 causes the link mechanism 9 to bend in response to a degree of parallelization between the linear-motion guide rail 64 and the linear-motion guide rail 83, making it possible to suppress load to be applied to the drive member 63 or the movable member 79. As a result, it becomes possible to move the movable linear conveyor 7 smoothly without requiring precise adjustment in mounting of the drive member 63 and the movable member 79 on the linear-motion guide rail 64 and the linear-motion guide rail 83 respectively.

The link mechanism 9 includes the spherical bearings 94 and 96 and has a degree of freedom by the spherical bearings 94 and 96. Using the spherical bearings 94 and 96 each having three degrees of freedom in the link mechanism 9 in this way causes the link mechanism 9 to bend flexibly, making it possible to suppress load more reliably to be applied to the drive member 63 or the movable member 79. As a result, even if a degree of parallelization between the linear-motion guide rail 64 and the linear-motion guide rail 83 is low, it is still possible to move the movable linear conveyor 7 smoothly.

The link mechanism 9 includes the two spherical bearings 94 and 96 arranged at different positions in the Z direction (movement direction). Using the two spherical bearings 94 and 96 in the link mechanism 9 in this way causes the link mechanism 9 to bend more flexibly, making it possible to suppress load with still higher reliability to be applied to the drive member 63 or the movable member 79.

The driver 61 moves the movable linear conveyor 7 in the Z direction between the facing position Pa of facing the fixed linear conveyor 5a (first fixed linear conveyor) mounted on the mounting frame 2 and the facing position Pb (second facing position) of facing the fixed linear conveyor 5b (second fixed linear conveyor) mounted on the mounting frame 2. In this configuration, positioning the movable linear conveyor 7 at the facing position Pa using the driver 61 allows transfer of the conveyor table T between the movable linear conveyor 7 and the fixed linear conveyor 5a. Also, positioning the movable linear conveyor 7 at the facing position Pb using the driver 61 allows transfer of the conveyor table T between the movable linear conveyor 7 and the fixed linear conveyor 5b. In particular, in the present embodiment, as the degree of freedom of the link mechanism 9 causes the link mechanism 9 to bend in response to a degree of parallelization between the linear-motion guide rail 64 and the linear-motion guide rail 83, the movable linear conveyor 7 can be guided in a proper posture to the facing position Pa or Pb. This achieves smooth transfer of the conveyor table T between the movable linear conveyor 7 and the fixed linear conveyor 5a or 5b.

The linear-motion guide rail 83 is mounted on the fixed linear conveyor 5a and is mounted on the fixed linear conveyor 5b. In this configuration, the movement of the movable linear conveyor 7 to the facing position Pa is guided by the linear-motion guide rail 83 mounted on the fixed linear conveyor 5a. This allows the movable linear conveyor 7 having moved to the facing position Pa to be positioned correctly relative to the fixed linear conveyor 5a. Likewise, the movement of the movable linear conveyor 7 to the facing position Pb is guided by the linear-motion guide rail 83 mounted on the fixed linear conveyor 5b. This allows the movable linear conveyor 7 having moved to the facing position Pb to be positioned correctly relative to the fixed linear conveyor 5b. As a result, it becomes possible to transfer the conveyor table T smoothly between the fixed linear conveyor 5a or 5b and the movable linear conveyor 7 independently of distortion or thermal deformation of the mounting frame 2 on which the fixed linear conveyors 5a and 5b are mounted.

The position detector 69 is provided to detect the position of the movable linear conveyor 7. The driver 61 controls the position of the movable linear conveyor 7 on the basis of a position detected by the position detector 69, thereby controlling positioning of the movable linear conveyor 7 at the facing position Pa or Pb. This configuration allows the position of the movable linear conveyor 7 relative to the fixed linear conveyor 5a or 5b to be controlled correctly on the basis of result of the detection by the position detector 69. However, the position detector 69 is merely to detect the position of the movable linear conveyor 7 at the location of the position detector 69 and is not configured to detect the posture of the movable linear conveyor 7. Hence, only using the position detector 69 causes a risk of transferring the conveyor table T while the movable linear conveyor 7 is in a tilted posture relative to the fixed linear conveyor 5a or 5b. In this regard, according to the present embodiment, as the degree of freedom of the link mechanism 9 causes the link mechanism 9 to bend in response to a degree of parallelization between the linear-motion guide rail 64 and the linear-motion guide rail 83, the movable linear conveyor 7 can be guided in a proper posture to the facing position Pa or Pb. This allows the movable linear conveyor 7 to be positioned at a proper position in a proper posture relative to the fixed linear conveyor 5a or 5b.

Thus, according to the above-described embodiment, the transport system 1 corresponds to an example of the "transport system" of the present disclosure, the mounting frame 2 corresponds to an example of the "mounting frame" of the present disclosure, the fixed linear conveyor 5a corresponds to an example of the "first fixed linear conveyor" of the present disclosure, the fixed linear conveyor 5b corresponds to an example of the "second fixed linear conveyor" of the present disclosure, the conveyor table transfer apparatus 6 corresponds to an example of the "conveyor table transfer apparatus" of the present disclosure, the motor 623 corresponds to an example of the "drive source" of the present disclosure, the drive member 63 corresponds to an example of the "drive member" of the present disclosure, the linear-motion guide rail 64 corresponds to an example of the "first linear-motion guide member" of the present disclosure, the position detector 69 corresponds to an example of the "position detector" of the present disclosure, the movable linear conveyor 7 corresponds to an example of the "movable linear conveyor" of the present disclosure, the movable member 79 corresponds to an example of the "movable member" of the present disclosure, the linear-motion guide rail 83 corresponds to an example of the "second linear-motion guide member" of the present disclosure, the link mechanism 9 corresponds to an example of the "link mechanism" of the present disclosure, the spherical bearings 94 and 96 correspond to an example of the "spherical bearing" of the present disclosure, the facing position Pa corresponds to an example of the "first facing position" of the present disclosure, the facing position Pb corresponds to an example of the "second facing position" of the present disclosure, the conveyor table T corresponds to an example of the "conveyor table" of the present disclosure, and the Z direction corresponds to an example of the "movement direction" of the present disclosure.

Figure 9:
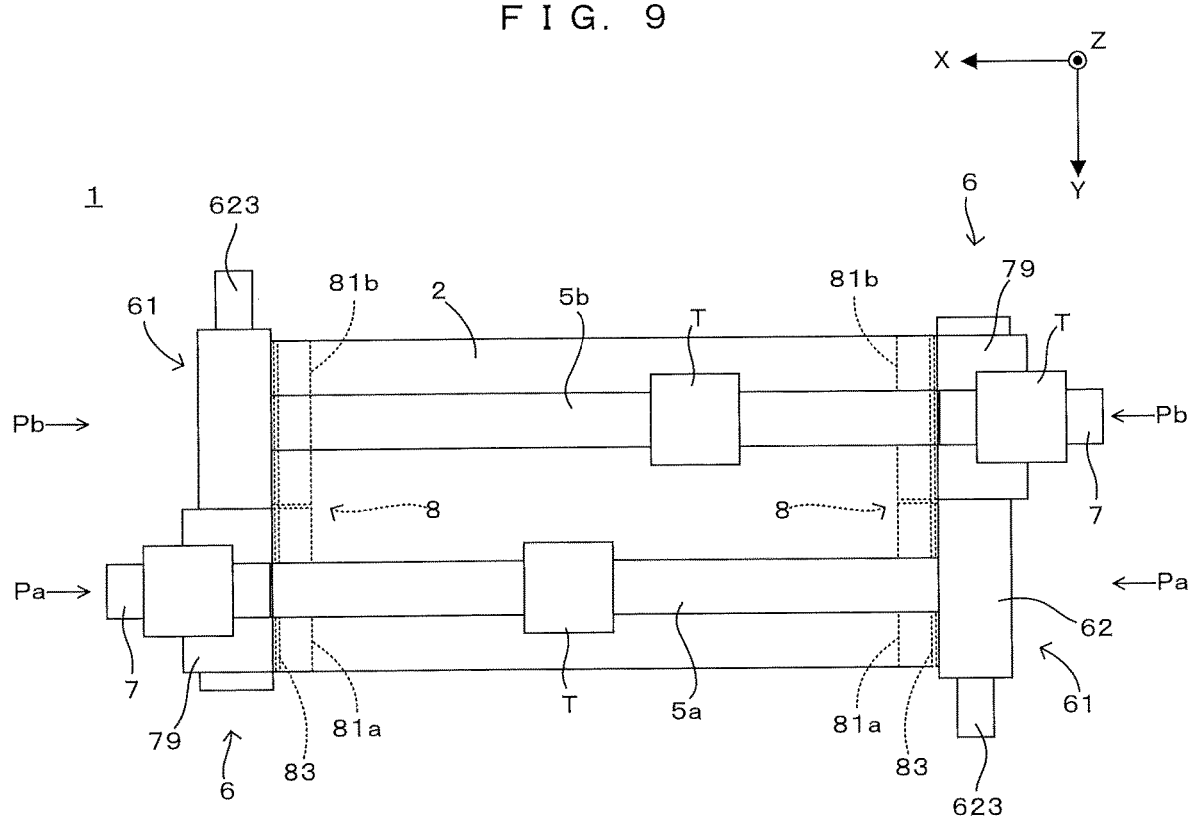
FIG. 9 is a plan view showing a transport system according to the modification.
Figure 10:
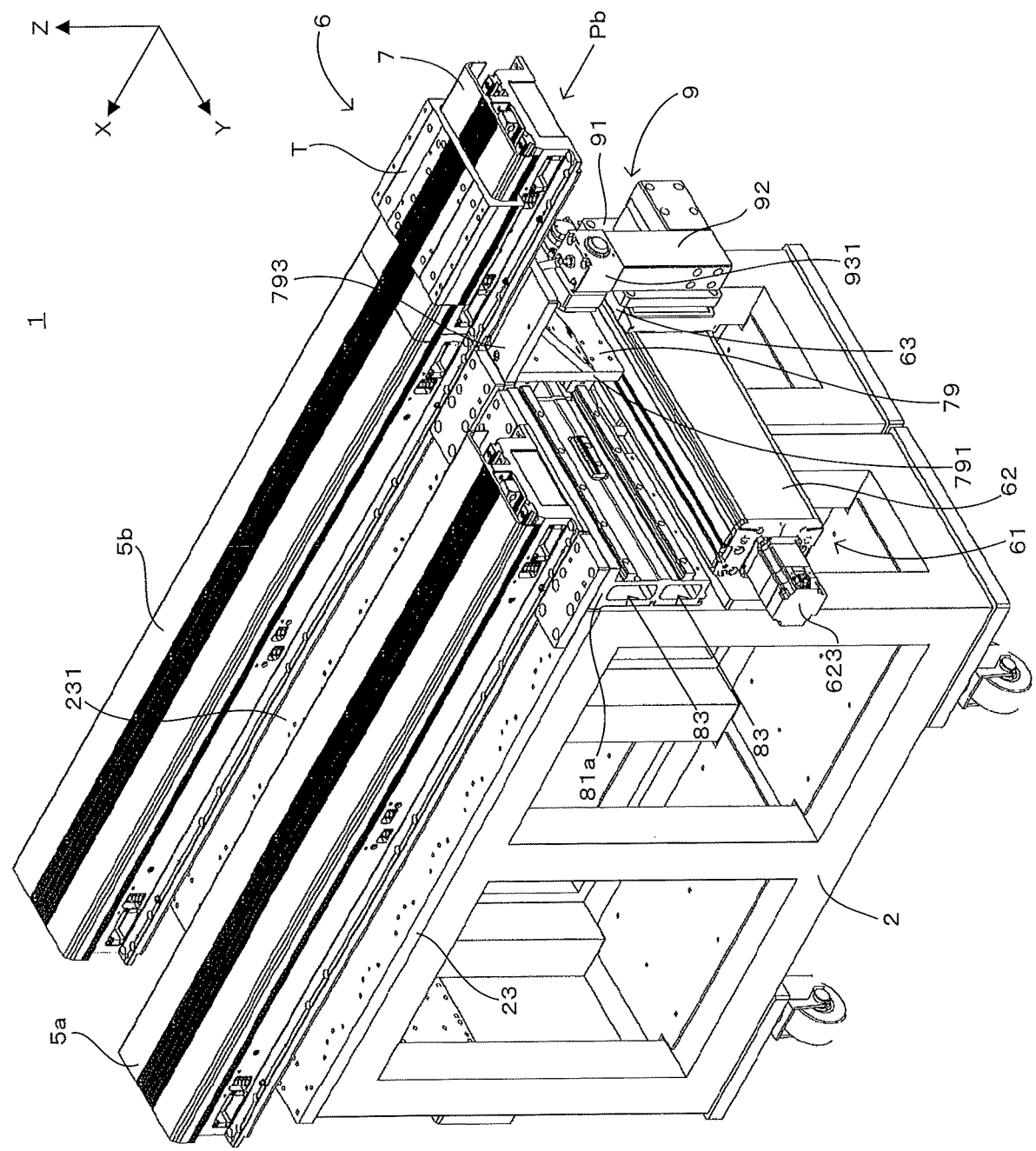
FIG. 10 is a partial perspective view showing the transport system in FIG. 1.
Figure 11:
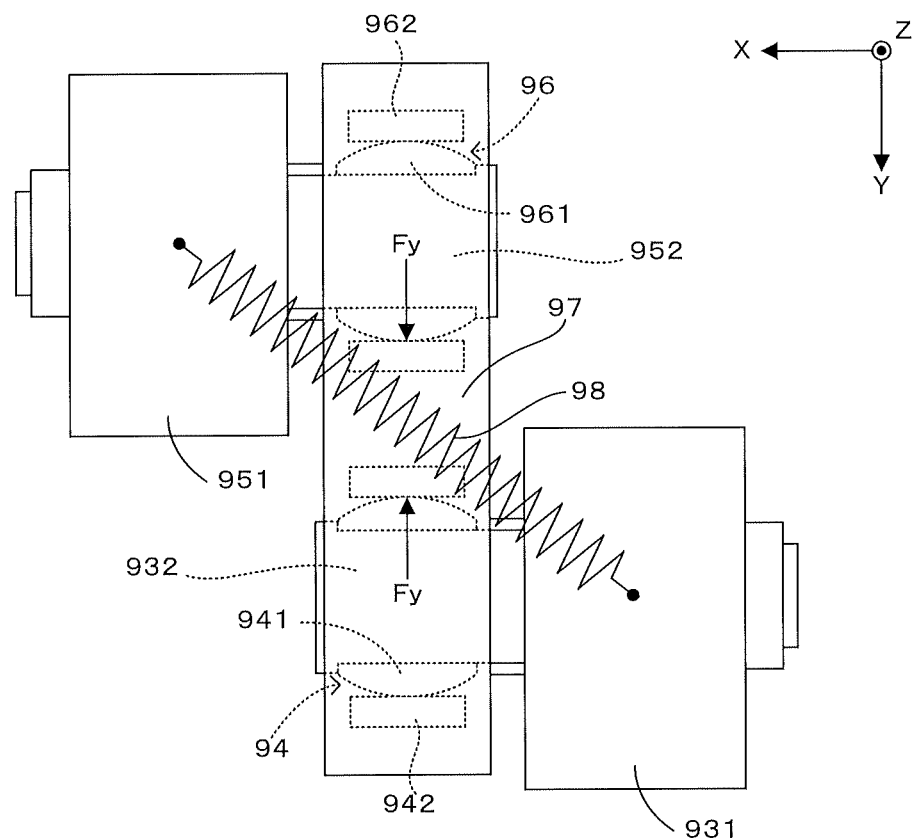
FIG. 11 schematically shows an example of a link mechanism belonging to the transport system shown in FIG. 9.

The present disclosure is not limited to the above-described embodiment, various changes can be added to the contents described above unless deviation from the purport of the disclosure occurs. For example, a configuration such as a modification shown in FIGS. 9 to 11 is possible. FIG. 9 is a plan view showing a transport system according to the modification. FIG. 10 is a partial perspective view showing the transport system in FIG. 1. FIG. 11 schematically shows an example of a link mechanism belonging to the transport system shown in FIG. 9. In FIG. 11, an internal configuration of a part of the link mechanism 9 is shown by dashed lines.

The above-described embodiment shown in FIGS. 1 to 8 and the modification shown in FIGS. 9 to 11 differ from each other mainly in a direction of driving the movable linear conveyor 7. While the movable linear conveyor 7 is driven in the Z direction in the above-described embodiment, the movable linear conveyor 7 is driven in the Y direction in the modification. Thus, the difference from the above-described embodiment will mainly be explained, and a common structure will be given a corresponding sign and explanation thereof will be omitted, if appropriate. Comparable effect is certainly achieved by the provision of the common structure.

In the transport system 1 according to the modification, the fixed linear conveyor 5a and the fixed linear conveyor 5b are mounted on the upper surface 231 of the same mounting stage 23 and are arranged parallel to the X direction while being spaced from each other in the Y direction. In response to this, the conveyor table transfer apparatus 6 drives the movable linear conveyor 7 in the Y direction to move the movable linear conveyor 7 between the facing position Pa of facing the fixed linear conveyor 5a from the X direction and the facing position Pb of facing the fixed linear conveyor 5b from the X direction.

In this linear-motion guide mechanism 8, the mounting blocks 81a and 81b are aligned in the Y direction in response to the fixed linear conveyors 5a and 5b respectively. The upper surface of the mounting block 81a is mounted on the bottom surface of the fixed linear conveyor 5a. The upper surface of the mounting block 81b is mounted on the bottom surface of the fixed linear conveyor 5b. The linear-motion guide rails 83 in a pair extend in the Y direction as bridges between the mounting block 81a and the mounting block 81b. The linear-motion guide rails 83 in a pair are mounted on the mounting blocks 81a and 81b while being spaced from each other in the Z direction and are supported parallel to the Y direction. The movable member 79 is engaged with the linear-motion guide rails 83 in a pair. Therefore, the movable member 79 is guided by the linear-motion guide rail 83 to move in the Y direction between the facing position Pa and the facing position Pb.

The single-axis robot 62 of the driver 61 is arranged parallel to the Y direction, and causes the motor 623 to drive the drive member 63 in the Y direction that is supported parallel to the Y direction and the Z direction. The linear-motion guide rails 64 in a pair (not shown in FIG. 9) extending parallel to the Y direction are mounted on the single-axis robot 62. The drive member 63 driven by the motor 623 moves in the Y direction while being guided by the linear-motion guide rails 64.

The link mechanism 9 connects the drive member 63 driven by the motor 623 and the movable member 79 supporting the movable linear conveyor 7. Thus, when the drive member 63 driven by the motor 623 moves in the Y direction while being guided by the linear-motion guide rails 64 in a pair, this movement of the drive member 63 is transmitted through the link mechanism 9 to the movable member 79 to drive the movable member 79 in the Y direction. As a result, the movable linear conveyor 7 is driven in the Y direction while being guided by the linear-motion guide rails 83 in a pair.

In the link mechanism 9, the connection plate 91 is arranged parallel to the Y direction and the Z direction and is mounted on the drive member 63. The arm 92 extends upward while being provided extensively and bent from the connection plate 91 in the X direction, the Y direction, and the Z direction. The shaft holder 931 is mounted on a tip (upper end) of the arm 92. A tip portion of the shaft 932 projects in the X direction from the shaft holder 931 toward the movable plate 791 side. The spherical bearing 94 is mounted on this tip portion of the shaft 932. A tip portion of the shaft 952 projects in the X direction from the shaft holder 951 mounted on the movable plate 791 toward the shaft holder 931 side. The spherical bearing 96 is mounted on this tip portion of the shaft 952. In this way, in the link mechanism 9, the spherical bearing 94 and the spherical bearing 96 are arranged in the Y direction and are held by the holder plate 97.

The link mechanism 9 further includes a bias spring 98 provided between the shaft holder 931 and the shaft holder 951. The bias spring 98 has both ends attached to corresponding ones of the shaft holder 931 and the shaft holder 951. The bias spring 98 generates elastic force of making the shaft holder 931 and the shaft holder 951 get closer to each other. As shown in FIG. 11, the shaft holder 931 and the shaft holder 951 are arranged at positions shifted from each other in the Y direction. This generates force of making the spherical bearing 94 and the spherical bearing 96 get closer to each other in the Y direction to press the inner race 941 and the outer race 942 of the spherical bearing 94 with pressing force Fy and to press the inner race 961 and the outer race 962 of the spherical bearing 96 with pressing force Fy. By doing so, backlash of the spherical bearings 94 and 96 in the Y direction are suppressed. The bias spring 98 is not limited to an extension coil spring that generates elastic force of making both ends thereof get closer to each other but can be a compression coil spring that generates elastic force of making both ends thereof get farther from each other.

In this modification, the link mechanism 9 connects the drive member 63 driven by the motor 623 (drive source) and the movable member 79 supporting the movable linear conveyor 7 also has one or more degrees of freedom. Thus, the degree of freedom of the link mechanism 9 causes the link mechanism 9 to bend in response to a degree of parallelization between the linear-motion guide rail 64 and the linear-motion guide rail 83, making it possible to suppress load to be applied to the drive member 63 or the movable member 79. As a result, it becomes possible to move the movable linear conveyor 7 smoothly without requiring precise adjustment in mounting of the drive member 63 and the movable member 79 on the linear-motion guide rail 64 and the linear-motion guide rail 83 respectively.

The spherical bearings 94 and 96 include the outer races 942 and 962, and the inner races 941 and 961 arranged inside the outer races 942 and 962 and contact with the outer races 942 and 962 at spherical surfaces of the inner races 941 and 961. The bias spring 98 (bias member) is provided to generate the pressing force Fy having a component acting in the Y direction (movement direction) in which the outer races 942 and 962 and the inner races 941 and 961 of the spherical bearings 94 and 96 are pressed. This configuration makes it possible to suppress backlash to be caused in the Y direction between the outer races 942, 962 and the inner races 941, 961 of the spherical bearings 94 and 96. This allows removal of influence to be caused by the backlash of the spherical bearings 94 and 96 on the position of the movable linear conveyor 7.

Like in the above-described modification, the configuration with the bias spring 98 is particularly preferred if the movement direction of the movable linear conveyor 7 is a horizontal direction (Y direction). Specifically, in this case, as the own weights of the outer races 942 and 962 and those of the inner races 941 and 961 of the spherical bearings 94 and 96 do not contribute to suppression of the backlash thereof, it is preferable to suppress the backlash using the bias spring 98.

If appropriate, changes other than those shown in the above-described modification can be made. For example, the configuration in FIGS. 1 to 7 of driving the movable linear conveyor 7 in the Z direction may be provided with the bias spring 98 to suppress the backlash of the spherical bearings 94 and 96.

The number of the spherical bearings provided at the link mechanism 9 is not limited to two but it may be one, or three or more.

A specific structure for providing the link mechanism 9 with a degree of freedom is not limited to the spherical bearing but can be other types of bearing, for example.

As long as the number of degrees of freedom of the link mechanism 9 is one or more, it is not limited to the number given in the above-described example.

The number of the fixed linear conveyors 5 is not limited to two but can be three or more. In this case, the linear-motion guide mechanism 8 may be provided to each of the fixed linear conveyors 5 or may be provided to only some of the fixed linear conveyors 5. Even in the latter case, effect comparable to that descried above is still achieved for these some of the fixed linear conveyors 5.

A method of driving the conveyor table T by the fixed linear conveyor 5 and the movable linear conveyor 7 is not limited to a method using a linear motor but can be a method using a combination of a screw and a hollow motor.

The specific configuration of the mounting block 81a or 81b is not limited to that in the above-described example using a combination of a plurality of plates. The mounting block 81 may be configured using a single rectangular member, for example.

The linear-motion guide rail 83 may be composed of a single rail without using a plurality of rails.

If the linear-motion guide rail 83 is composed of a plurality of rails, only the two split guide rails 831 and 832 may be used for forming the linear-motion guide rail 83 without the intermediary guide rail 833.

Alternatively, the linear-motion guide rail 83 may be composed of a plurality of rails and may be composed of four or more rails.

The characteristics of the split guide rail 831, the split guide rail 832, and the connection guide rail 833 are changeable, if appropriate. More specifically, the split guide rail 831 and the connection guide rail 833 can be configured in such a manner as to differ from each other in at least one of material, strength, and rigidity. For providing the difference in rigidity, the rigidity of the connection guide rail 833 can be reduced compared to that of the split guide rail 831. Likewise, the split guide rail 832 and the connection guide rail 833 can be configured in such a manner as to differ from each other in at least one of material, strength, and rigidity. For providing the difference in rigidity, the rigidity of the connection guide rail 833 can be reduced compared to that of the split guide rail 832.

The linear-motion guide rail 83 or the linear-motion guide rail 64 can be changed to other members to provide linear-motion guide such as a linear bush, a ball spline, or a cum follower.

In determining the positions of the fixed linear conveyor 5 and the mounting block 81 through engagement between the engagement projection and the engagement hole, the engagement hole may be provided to the fixed linear conveyor 5 and the engagement projection may be provided to the mounting block 81.

What is claimed is:

1. A conveyor table transfer apparatus comprising:
   a driver including a drive member and a drive source configured to drive the drive member and a first linear-motion guide member configured to guide movement of the drive member driven by the drive source;
   a movable member configured to support a movable linear conveyor configured to convey a conveyor table;
   a second linear-motion guide member configured to guide movement of the movable member; and
   a link mechanism configured to connect the movable member and the drive member to each other and have one or more degrees of freedom, wherein
   when the drive member is driven along the first linear-motion guide member, the movable member is driven by the drive member through the link mechanism to move along the second linear-motion guide member, thereby moving the movable linear conveyor in a predetermined movement direction,
   the driver moves the movable linear conveyor in the predetermined movement direction between a first facing position of facing a first fixed linear conveyor mounted on a mounting frame and a second facing position of facing a second fixed linear conveyor mounted on the mounting frame, and
   the second linear-motion guide member is mounted on the first fixed linear conveyor and is mounted on the second fixed linear conveyor.

2. The conveyor table transfer apparatus according to claim 1, wherein
   the link mechanism includes a spherical bearing and has the degrees of freedom by the spherical bearing.

3. The conveyor table transfer apparatus according to claim 2, wherein
   the link mechanism includes two spherical bearings arranged at different positions in the movement direction.

4. The conveyor table transfer apparatus according to claim 2, further comprising:
   a position detector configured to detect a position of the movable linear conveyor, wherein
   the driver is configured to control positioning of the movable linear conveyor at the first facing position and is configured to control positioning of the movable linear conveyor at the second facing position by controlling the position of the movable linear conveyor on the basis of a position detected by the position detector.

5. A transport system comprising:
   a first fixed linear conveyor configured to drive a conveyor table;
   a second fixed linear conveyor configured to drive the conveyor table; and
   the conveyor table transfer apparatus according to claim 2, wherein
   the conveyor table transfer apparatus is configured to transfer the conveyor table between the first fixed linear conveyor and the second fixed linear conveyor.

6. The conveyor table transfer apparatus according to claim 3, wherein
   the spherical bearing has an outer race, and an inner race that is arranged inside the outer race and contacts with the outer race at its spherical surface, and
   the conveyor table transfer apparatus further comprises:
   a bias member configured to generate pressing force having a component acting in the movement direction with which the outer race and the inner race of the spherical bearing are pressed.

7. The conveyor table transfer apparatus according to claim 3, further comprising:
a position detector configured to detect a position of the movable linear conveyor, wherein
the driver is configured to control positioning of the movable linear conveyor at the first facing position and is configured to control positioning of the movable linear conveyor at the second facing position by controlling the position of the movable linear conveyor on the basis of a position detected by the position detector.

8. A transport system comprising:
a first fixed linear conveyor configured to drive a conveyor table;
a second fixed linear conveyor configured to drive the conveyor table; and
the conveyor table transfer apparatus according to claim 3, wherein
the conveyor table transfer apparatus is configured to transfer the conveyor table between the first fixed linear conveyor and the second fixed linear conveyor.

9. The conveyor table transfer apparatus according to claim 2, wherein
the spherical bearing has an outer race, and an inner race that is arranged inside the outer race and contacts with the outer race at its spherical surface, and
the conveyor table transfer apparatus further comprises:
a bias member configured to generate pressing force having a component acting in the movement direction with which the outer race and the inner race of the spherical bearing are pressed.

10. The conveyor table transfer apparatus according to claim 9, wherein
the movement direction is a horizontal direction.

11. The conveyor table transfer apparatus according to claim 9, further comprising:
a position detector configured to detect a position of the movable linear conveyor, wherein
the driver is configured to control positioning of the movable linear conveyor at the first facing position and is configured to control positioning of the movable linear conveyor at the second facing position by controlling the position of the movable linear conveyor on the basis of a position detected by the position detector.

12. A transport system comprising:
a first fixed linear conveyor configured to drive a conveyor table;
a second fixed linear conveyor configured to drive the conveyor table; and
the conveyor table transfer apparatus according to claim 9, wherein
the conveyor table transfer apparatus is configured to transfer the conveyor table between the first fixed linear conveyor and the second fixed linear conveyor.

13. The conveyor table transfer apparatus according to claim 10, further comprising:
a position detector configured to detect a position of the movable linear conveyor, wherein
the driver is configured to control positioning of the movable linear conveyor at the first facing position and is configured to control positioning of the movable linear conveyor at the second facing position by controlling the position of the movable linear conveyor on the basis of a position detected by the position detector.

14. A transport system comprising:
a first fixed linear conveyor configured to drive a conveyor table;
a second fixed linear conveyor configured to drive the conveyor table; and
the conveyor table transfer apparatus according to claim 10, wherein
the conveyor table transfer apparatus is configured to transfer the conveyor table between the first fixed linear conveyor and the second fixed linear conveyor.

15. The conveyor table transfer apparatus according to claim 1, further comprising:
a position detector configured to detect a position of the movable linear conveyor, wherein
the driver is configured to control positioning of the movable linear conveyor at the first facing position and is configured to control positioning of the movable linear conveyor at the second facing position by controlling the position of the movable linear conveyor on the basis of a position detected by the position detector.

16. A transport system comprising:
a first fixed linear conveyor configured to drive a conveyor table;
a second fixed linear conveyor configured to drive the conveyor table; and
the conveyor table transfer apparatus according to claim 15, wherein
the conveyor table transfer apparatus is configured to transfer the conveyor table between the first fixed linear conveyor and the second fixed linear conveyor.

17. A transport system comprising:
a first fixed linear conveyor configured to drive a conveyor table;
a second fixed linear conveyor configured to drive the conveyor table; and
the conveyor table transfer apparatus according to claim 1, wherein
the conveyor table transfer apparatus is configured to transfer the conveyor table between the first fixed linear conveyor and the second fixed linear conveyor.

18. A conveyor table transfer method comprising:
guiding a drive member using a first linear-motion guide member while driving the drive member using a drive source; and
guiding movement of a movable member using a second linear-motion guide member, the movable member being configured to support a movable linear conveyor configured to drive a conveyor table, wherein
the movable member and the drive member are connected to each other by a link mechanism having one or more degrees of freedom, and
when the drive member is driven along the first linear-motion guide member, the movable member is driven by the drive member through the link mechanism to move along the second linear-motion guide member, thereby moving the movable linear conveyor in a predetermined movement direction,
the driver moves the movable linear conveyor in the predetermined movement direction between a first facing position of facing a first fixed linear conveyor mounted on a mounting frame and a second facing position of facing a second fixed linear conveyor mounted on the mounting frame, and
the second linear-motion guide member is mounted on the first fixed linear conveyor and is mounted on the second fixed linear conveyor.

* * * * *